US008895900B2

United States Patent
Ji et al.

(10) Patent No.: US 8,895,900 B2
(45) Date of Patent: Nov. 25, 2014

(54) NANO PARTICLE GENERATOR

(75) Inventors: Jun Ho Ji, Namyangju-si (KR); Hyung Soo Noh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1095 days.

(21) Appl. No.: 12/318,277

(22) Filed: Dec. 23, 2008

(65) Prior Publication Data
US 2009/0127252 A1 May 21, 2009

Related U.S. Application Data

(62) Division of application No. 11/508,319, filed on Aug. 23, 2006, now Pat. No. 7,863,545.

(30) Foreign Application Priority Data

Aug. 23, 2005 (KR) .................. 10-2005-0077409

(51) Int. Cl.
| | |
|---|---|
| H05B 1/00 | (2006.01) |
| F02M 31/12 | (2006.01) |
| B82Y 40/00 | (2011.01) |
| B82Y 30/00 | (2011.01) |
| B01J 6/00 | (2006.01) |

(52) U.S. Cl.
CPC .. B01J 6/00 (2013.01); B82Y 40/00 (2013.01); B01J 2219/00128 (2013.01); B01J 2219/00013 (2013.01); B82Y 30/00 (2013.01); B01J 2219/0013 (2013.01); B01J 2219/00135 (2013.01); B01J 6/007 (2013.01); B01J 2219/00155 (2013.01)
USPC .......................................... 219/219; 392/386

(58) Field of Classification Search
USPC .............. 219/219; 392/386, 387; 128/202.21, 128/203.12, 203.16, 203.17, 203.26, 203.27
See application file for complete search history.

(56) References Cited

U.S. PATENT DOCUMENTS

| | | | |
|---|---|---|---|
| 3,452,970 A | * | 7/1969 | Haft et al. ...................... 432/265 |
| 3,949,743 A | | 4/1976 | Shanbrom |

(Continued)

FOREIGN PATENT DOCUMENTS

| | | |
|---|---|---|
| EP | 1 676 631 | 7/2006 |
| JP | 62-168542 | 7/1987 |

(Continued)

OTHER PUBLICATIONS

U.S. Office Action mailed Oct. 5, 2009 in related U.S. Appl. No. 11/508,319.

(Continued)

*Primary Examiner* — Sang Y Paik
(74) *Attorney, Agent, or Firm* — Staas & Halsey LLP (57) ABSTRACT

The nano particle generator includes a body, a heating unit to heat a material received in the body such that the material is evaporated, a channel extending through the body such that a fluid to condense the evaporated material flows along the channel, and an insulating member to prevent heat generated from the heating unit from being transmitted to the body. The heating unit heats the material while the heating unit is in direct contact with the material, and the heating unit is in point or line contact with the insulating member. The heating unit has a plurality of locating parts formed therein such that the material is located in the locating parts. Different materials are located in the locating parts, and the locating parts are heated to temperatures at which the respective materials are evaporated in the same time.

11 Claims, 10 Drawing Sheets

(56) References Cited

U.S. PATENT DOCUMENTS

| | | | |
|---|---|---|---|
| 4,576,725 A | | 3/1986 | Miura et al. |
| 4,735,217 A | | 4/1988 | Gerth et al. |
| 4,865,832 A | | 9/1989 | Kamijyo |
| 4,917,119 A | | 4/1990 | Potter et al. |
| 5,038,769 A | | 8/1991 | Krauser |
| 5,144,962 A | * | 9/1992 | Counts et al. ............ 131/194 |
| 5,249,586 A | | 10/1993 | Morgan et al. |
| 5,264,681 A | * | 11/1993 | Nozaki et al. ............ 219/544 |
| 5,388,574 A | | 2/1995 | Ingebrethsen |
| 5,456,247 A | | 10/1995 | Shilling et al. |
| 5,514,350 A | | 5/1996 | Kear et al. |
| 5,537,507 A | * | 7/1996 | Mariner et al. ............ 392/389 |
| 5,575,941 A | * | 11/1996 | Johnson ............ 219/544 |
| 5,957,124 A | | 9/1999 | Lloyd et al. |
| 6,102,036 A | | 8/2000 | Slutsky et al. |
| 6,381,408 B1 | | 4/2002 | Jaworski et al. |
| 6,468,497 B1 | | 10/2002 | Khan et al. |
| 7,078,016 B2 | | 7/2006 | Rabinowitz |
| 7,384,448 B2 | | 6/2008 | Johnson, Jr. |
| 7,913,688 B2 | * | 3/2011 | Cross et al. ............ 128/203.26 |
| 2002/0112723 A1 | | 8/2002 | Schuster et al. |
| 2003/0003034 A1 | | 1/2003 | Khan et al. |
| 2003/0007925 A1 | | 1/2003 | Khan et al. |
| 2003/0115986 A1 | | 6/2003 | Pozarnsky et al. |
| 2005/0179175 A1 | | 8/2005 | Johnson, Jr. |
| 2006/0140596 A1 | | 6/2006 | Ji et al. |

FOREIGN PATENT DOCUMENTS

| | | |
|---|---|---|
| JP | 2-131134 | 5/1990 |
| JP | 3-178332 | 8/1991 |
| JP | 2007-54832 | 3/2007 |
| KR | 10-2001-0099547 | 11/2001 |

OTHER PUBLICATIONS

U.S. Office Action mailed Apr. 14, 2009 in related U.S. Appl. No. 11/508,319.

U.S. Office Action mailed Aug. 12, 2008 in related U.S. Appl. No. 11/508,319.

Jae Hee Jung, et al. "Metal nanoparticle generation using a small heather with a local heating area", Aerosol Science 37, 2006, pp. 1662-1670.

Jun Ho Ji et al., "Twenty-Eight Day Inhalation Toxicity Study of Silver Nanoparticles in Sprague-Dawley Rats", Jan. 1, 2007, pp. 857-871.

Jun Ho Ji et al., Long-Term Stability Characteristics of Metal Nanoparticle Generator Using Small Ceramic Heater for Inhalation Toxicity Studies, Jul. 1, 2007, pp. 745-751.

Jun Ho Ji et al., "Evaluation of a Silver Nanoparticle Generator Using a Small Ceramic Heater for Inactivation of S. epidermidis Bioaerosols", Aug. 1, 2007, pp. 786-793.

U.S. Appl. No. 11/508,319, filed Aug. 23, 2006, Jun Ho Ji et al., Samsung Electronics Co., Ltd.

European Search Report for Application 06119300.9, dated Dec. 19, 2006.

U.S. Appl. No. 11/508,319, filed Aug. 26, 2006, Jun Ho Ji et al., Samsung Electronics Co., Ltd.

Notice of Allowance dated Sep. 2, 2010, issued in the file history of U.S. Appl. No. 11/508,319.

Japanese Decision on Grant dated May 25, 2010, issued in corresponding Japanese Patent Application.

Chinese Office Action dated Jan. 31, 2011, issued in Chinese Patent Application No. 200910002120.4.

Japanese Office Action dated Feb. 7, 2012 issued in corresponding Japanese Patent Application No. 2009-023674.

* cited by examiner

NANO PARTICLE GENERATOR

CROSS-REFERENCE TO RELATED APPLICATIONS

This application is a divisional of prior U.S. patent application Ser. No. 11/508,319, filed Aug. 23, 2006 now U.S. Pat. No. 7,863,545, which claims the benefit of Korean Patent Application No. 2005-77409, filed on Aug. 23, 2005 in the Korean Intellectual Property Office, the disclosures of which are incorporated herein by reference.

BACKGROUND OF THE INVENTION

1. Field of the Invention

The present invention relates to a nano particle generator, and, more particularly, to a nano particle generator that can reduce power consumption, can be miniaturized, and can generate nano particles having various different material characteristics at the same time.

2. Description of the Related Art

Generally, a nano particle is an ultramicroscopic particle having a size of 1 nm to 100 nm. The nano particle has unique physical and chemical characteristics depending upon the size of the particle and the properties of a material.

Recently, continuous attempts have been made to generate nano particles from a material having bactericidal and antibacterial properties, such as gold and silver, or a material having toxic gas adsorption, such as titanium dioxide, thereby achieving bactericidal and antibacterial activities against biological pollutants and removing toxic gases, such as volatile organic compounds (VOC) and ozone by absorption.

An example of a method of generating nano particles is a gas condensing method in which a material is evaporated by heating, and the evaporated gas is condensed to generate nano particles. A conventional nano particle generator for generating nano particles using the gas condensing method will be described below.

The conventional nano particle generator includes a body formed in the shape of an electric heating furnace to maintain high temperature, a tube extending through the body, a container disposed in the center of the tub to receive a material from which nano particles are to be formed, and a heating body mounted between inner and outer walls of the body at the region corresponding to the container.

When the heating body is heated while a fluid, such as air, flows along the tube of the nano particle generator with the above-stated construction, the interior temperature of the body is increased. As a result, the tube is heated, and therefore, the interior temperature of the tube is increased. When the temperature applied to the material exceeds a predetermined temperature level, the material is evaporated with the result that gas is generated from the material. The gas is condensed by the fluid flowing along the tube to generate nano particles. The generated nano particles are discharged out of the body along with the fluid.

When the temperature of the electric heating furnace, the flow rate of the fluid flowing along the tube, and the size of the container to receive the material are controlled in the nano particle generator with the above-stated construction, it is possible to generate nano particles having a size of 1 to 100 nm and a concentration of $10^6$ to $10^8/cm^2$.

In the conventional nano particle generator that generates nano particles using the gas condensing method, however, the interior temperature of the body, which has a large space, must be increased to from several hundred degrees to several thousand degrees. As a result, power consumption is increased.

Also, a large space is needed between the heating body and the material. As a result, it is difficult to reduce the size of the nano particle generator.

Furthermore, several materials having different evaporation temperatures cannot be evaporated at the same time in a single nano particle generator. As a result, it is not possible to generate nano particles having various characteristics.

SUMMARY OF THE INVENTION

Therefore, it is an aspect of the invention to provide a nano particle generator that heats a material to generate nano particles with reduced power consumption.

It is another aspect of the invention to provide a small-sized nano particle generator.

It is yet another aspect of the invention to provide a nano particle generator that generates nano particles having various different material characteristics at the same time.

In accordance with one aspect, the present invention provides a nano particle generator comprising: a body; a heating unit to heat a material received in the body such that the material is evaporated; a channel extending through the body such that a fluid to condense the evaporated material flows along the channel; and an insulating member to prevent heat generated from the heating unit from being transmitted to the body, wherein the heating unit heats the material while the heating unit is in direct contact with the material, and the heating unit is in point or line contact with the insulating member.

The longitudinal direction of the channel intersects the evaporation direction of gas evaporated from the material.

The nano particle generator further comprises: a partition plate to partition the channel and the heating unit such that the fluid flowing along the channel does not directly contact the heating unit.

The channel is vertically disposed, and only the lower end of the heating unit is supported by the insulating member.

The channel is divided into a plurality of channels about the heating unit, and the heating unit has a locating part formed in at least one side thereof such that the material is located in the locating part.

The material is coated on the locating part or is located in the locating part after the material is sintered.

The locating part is formed in the shape of a groove such that the material is not separated from the locating part even when the phase of the material is changed.

The heating unit has a locating part formed in the highest-temperature region thereof such that the material is located in the locating part.

The heating unit has a plurality of locating parts.

The same material is located in the locating parts. Alternatively, different materials are located in the locating parts, and the locating parts are heated to temperatures at which the respective materials are evaporated in the same time.

The heating unit includes a heating body having a plurality of locating parts formed therein and a heating wire buried in the heating body to heat the locating parts, and the resistance of the heating wire buried around the respective locating parts is changed such that the locating parts are heated to different temperatures.

In accordance with another aspect, the present invention provides a nano particle generator comprising: a body; a heating unit to heat a material received in the body such that the material is evaporated; and a channel extending through the body such that a fluid to condense the evaporated material flows along the channel, wherein the heating unit has a plurality of locating parts formed therein such that the material is located in the locating parts.

The same material is located in the locating parts.

Different materials are located in the locating parts, and the locating parts are heated to temperatures at which the respective materials are evaporated in the same time.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Reference will now be made in detail to the embodiment of the present invention, examples of which are illustrated in the accompanying drawings, wherein like reference numerals refer to like elements throughout. The embodiment is described below to explain the present invention by referring to the figures.

Figure 1:
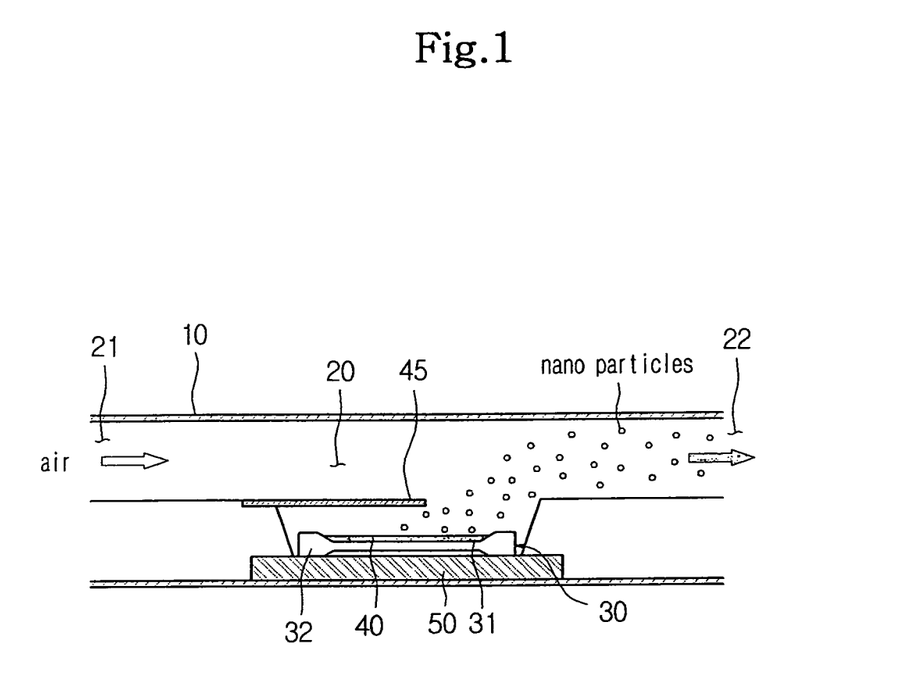
FIG. 1 is a view illustrating a nano particle generator according to a first embodiment of the present invention.

FIG. 1 is a view illustrating a nano particle generator according to a first embodiment of the present invention.

As shown in FIG. 1, the nano particle generator includes a body 10 constituting the external appearance thereof, a channel 20 formed in the upper part of the body 10, such that the channel 20 extends in the lateral direction of the body 10, to allow a fluid to flow therethrough, and a heating unit 30 mounted in the lower part of the body 10 to heat a material 40.

Also, a blowing fan (not shown) is mounted to provide a blowing force, by which the fluid is supplied into the channel 20 through an inlet 21 of the channel 20 and nano particles generated from the material 40 heated by the heating unit 30 are discharged out of the body 10.

The heating unit 30, which is disposed below the channel 20, heats the material 40, from which the nano particles are to be generated, while the heating unit 30 is in direct contact with the material 40. When the heating unit 30 heats the material 40 while the heating unit 30 is in direct contact with the material 40, i.e., in a direct heating fashion, it is possible to heat the material 40 to a temperature at which the material 40 is evaporated in short time, and therefore, the power consumption is reduced. Also, no space is necessary between the heating unit 30 and the material 40, and therefore, the size of the nano particle generator is reduced.

In the upper part of the heating unit 30 is formed a locating part 31 depressed at the center thereof such that the material 40 can be located in the locating part 31. Consequently, it is possible to locate the material 40 in the locating part 31 even though the material 40 is a powdered material.

Under the heating unit 30 is disposed an insulating member 50 to support the heating unit 30 and prevent heat generated from the heating unit from being discharged out of the body 10. The heat generated from the heating unit 30 intensively heats the material 40 due to the insulating member 50, and therefore, it is possible to evaporate the material 40 in short time. Furthermore, when the nano particle generator is mounted in electric home appliances, the electric home appliances are prevented from being damaged due to heat generated from the heating unit 30.

A supporting part 32 of the heating unit 30, at which the heating unit 30 is supported by the insulating member 50, is in contact with the insulating member 50 at opposite ends thereof such that the supporting part 32 is in contact with the insulating member over the minimum area. The center of the supporting part 32 is spaced apart from the insulating member 50. Consequently, the supporting member 32 is in point or line contact with the insulating member 50. This is because, if the contact area between the heating unit 30 and the insulating member 50 is large, a large amount of heat generated from the heating unit 30 is transmitted to the insulating member 50, and therefore, is takes plenty of time to heat and evaporate the material 40.

Between the channel 20 and the heating unit 30 is mounted a partition plate 45 to partition the channel 20 and the heating unit 30 from each other such that the fluid flowing along the channel 20 is not brought into direct contact with the heating unit 30. If the fluid flowing along the channel 20 directly contacts the heating unit 30, the temperature of the heating unit may be reduced by low-temperature fluid at the time of heating the heating unit 30. The partition plate 45 is provided to prevent such lowering of the temperature of the heating unit 30. Also, the partition plate 45 is provided to partially interrupt a radiant heat generated from the heating unit 30, when the heating unit 30 is heated to high temperature, from being transmitted to the upper part of the body 10, in which the insulating member 50 is not mounted, and thus, to prevent the body 10 from being heated. Consequently, it is preferable to make the partition plate 45 of a material that can be deformed at high temperature.

When the temperature of the heating unit 30, which has a heating wire (not shown) mounted therein, is increased in the nano particle generator with the above-described construction, the temperature of the material 40 contacting the heating unit 30 is increased to an evaporation temperature. When the material 40 is heated to more than the evaporation temperature, the surface of the material 40 facing the channel 20 is evaporated.

The evaporated material is drawn to the channel 20, which has relatively low pressure, due to the fluid flowing along the channel 20, and is instantaneously cooled by the low-temperature fluid into solid particles of a nanometer size. The generated nano particles are discharged through an outlet 22 of the channel 20 together with the surrounding fluid, and are then injected to a desired area through a connection pipe (not shown).

Figure 2:
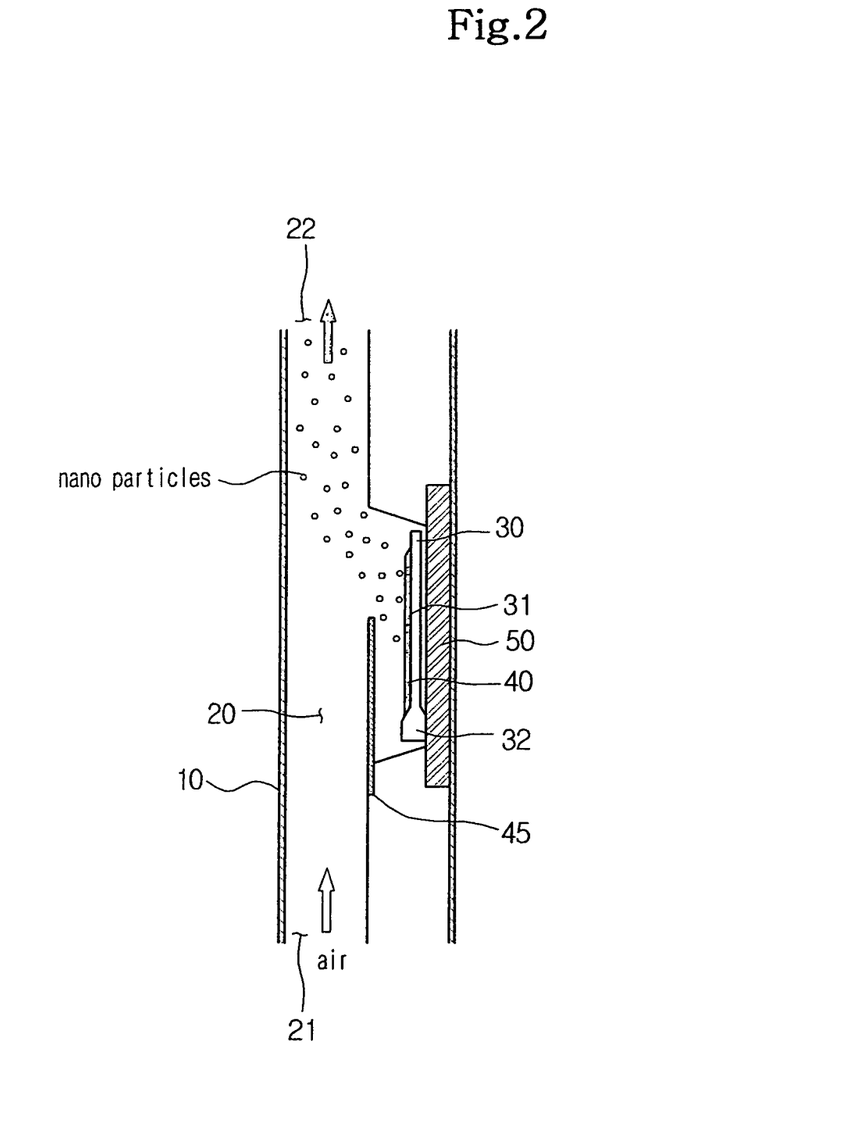
FIG. 2 is a view illustrating a nano particle generator according to a second embodiment of the present invention.

FIG. 2 is a view illustrating a nano particle generator according to a second embodiment of the present invention.

As shown in FIG. 2, the body 10 of the nano particle generator is vertically disposed, and therefore, the channel 20 is formed in the vertical direction. The inlet 21 of the channel 20 is disposed at the lower end of the body 10, and the outlet 22 of the channel 20 is disposed at the upper end of the body 10. Consequently, a fluid flows from the bottom of the body 10 to the top of the body 10. In this embodiment, the heating unit 30 is supported by the insulating member 50 only at the lower end thereof, and the heating unit 30 is spaced apart from the insulating member 50 at the upper end thereof. Consequently, the contact area between the heating unit 30 and the insulating member 50 is minimized. Although the lower end of the heating unit 30 is supported by the insulating member 50 as described above, gravity is applied to the lower end of the heating unit 30, and therefore, the heating unit 30 is stably supported.

In this embodiment, the material 40 cannot be located in the locating part 31 of the heating unit 30 when the material 40 is a powdered material. Consequently, it is preferable to coat the material 40 on the locating part 31 or to sinter and locate the material in the locating part 31.

Figure 3:
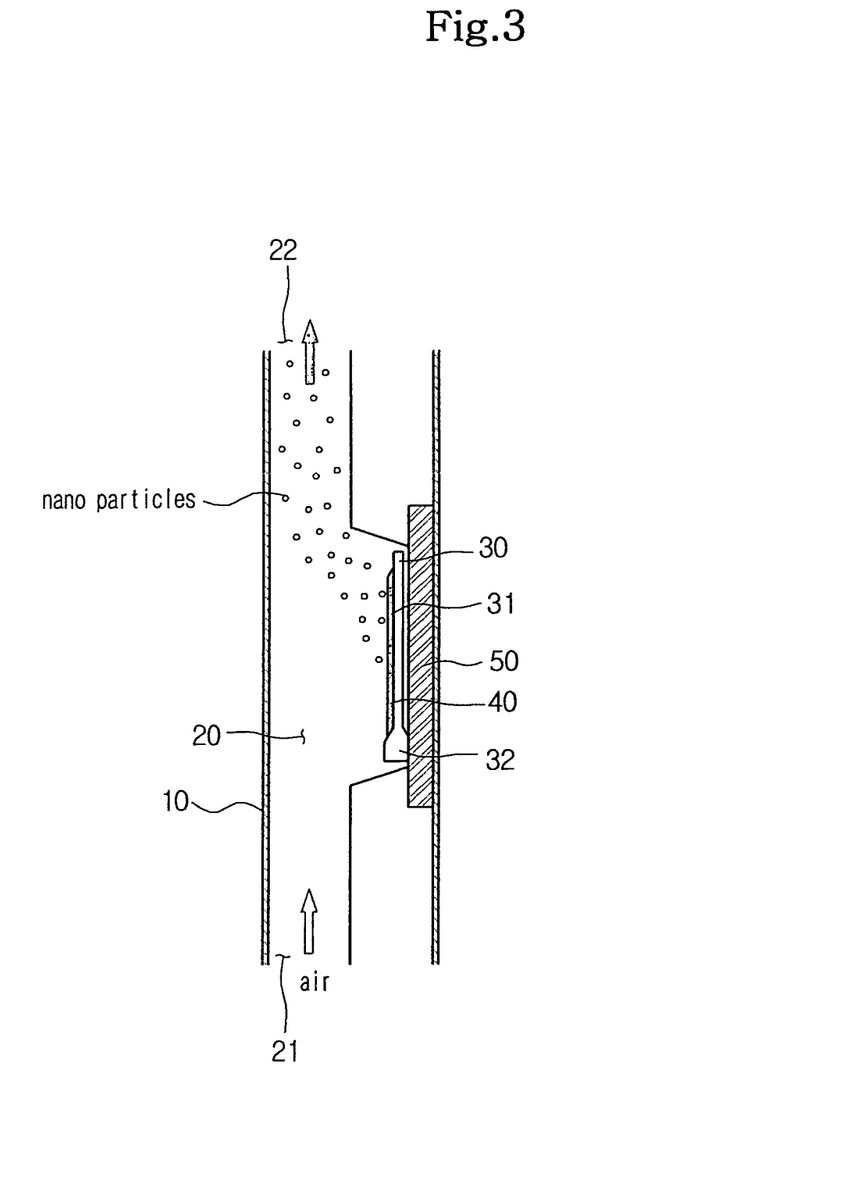
FIG. 3 is a view illustrating a nano particle generator according to a third embodiment of the present invention.

FIG. 3 is a view illustrating a nano particle generator according to a third embodiment of the present invention.

In this embodiment, the nano particle generator does not include a partition plate to partition the channel 20 and the heating unit 30 from each other.

Instead, the nano particle generator is constructed such that a fluid can flow along the channel at more than a predetermined speed. In this case, the straight movability of the fluid is increased, and therefore, the fluid flowing along the channel 20 does not directly contact the heating unit even without the provision of the partition plate. Also, the fluid, such as air, flowing along the channel 20 forms an insulating layer without the provision of the partition plate, and therefore, it is possible to prevent heat generated from the heating unit 30 from being transmitted to the body 10.

Figure 4:
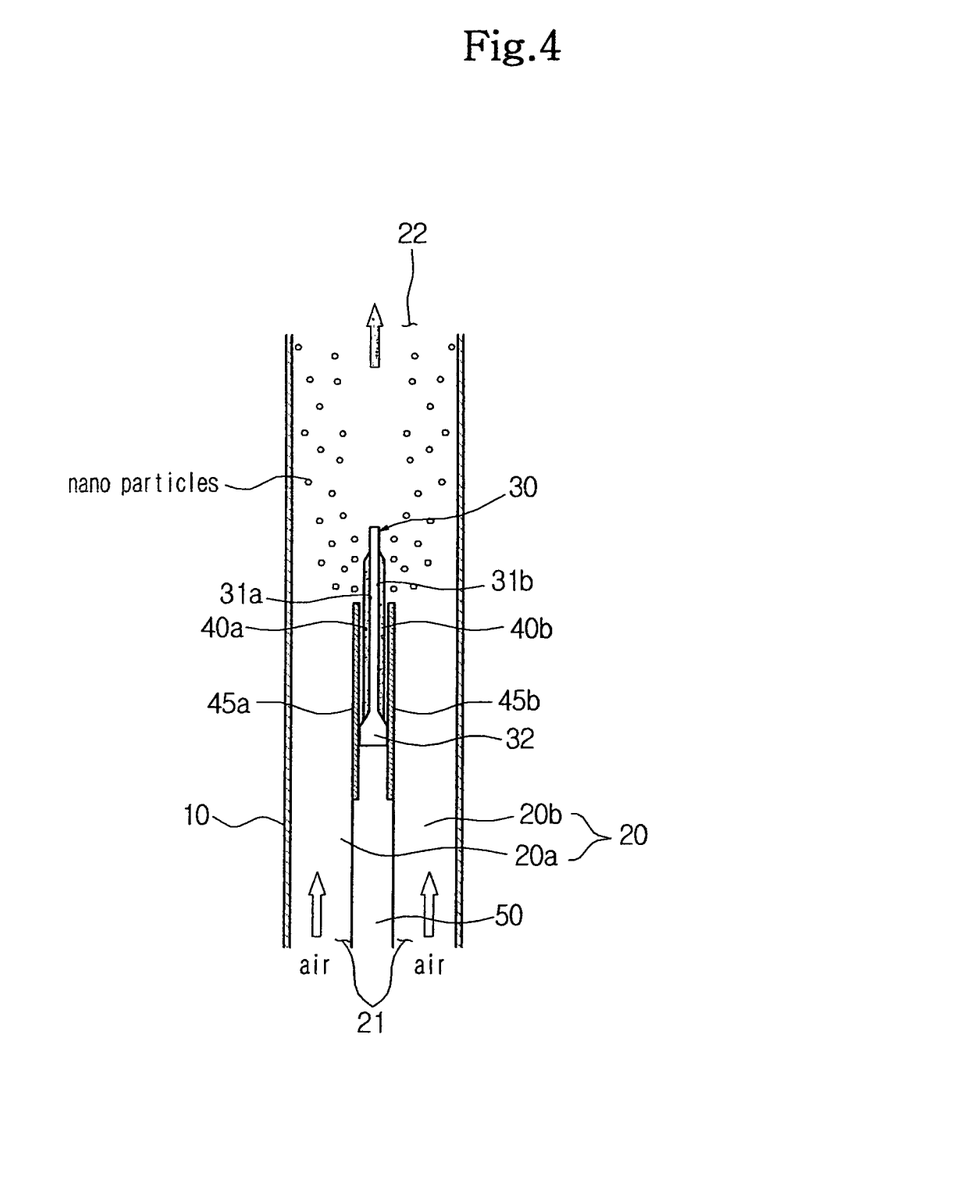
FIG. 4 is a view illustrating a nano particle generator according to a fourth embodiment of the present invention.

FIG. 4 is a view illustrating a nano particle generator according to a fourth embodiment of the present invention.

In this embodiment, the channel 20 is partitioned into two channels 20a and 20b by the insulating member 50 and the heating unit 30. A fluid flows along the channels 20a and 20b from the bottom of body 10 to the top of the body 10. Also, locating parts 31a and 31b are formed at opposite sides of the heating unit 30 such that materials 40a and 40b can be evaporated by the fluid flowing along the channels 20a and 20b. The materials 40a and 40b are located in the locating parts 31a and 31b, respectively. In addition, between the respective channels 20a and 20b and the heating unit 30 are disposed partition plates 45a and 45b, by which the fluid flowing along the channels 20a and 20b does not directly contact the heating unit 30, and therefore, heat generated from the heating unit is prevented from being transmitted to the body 10.

Figure 5:
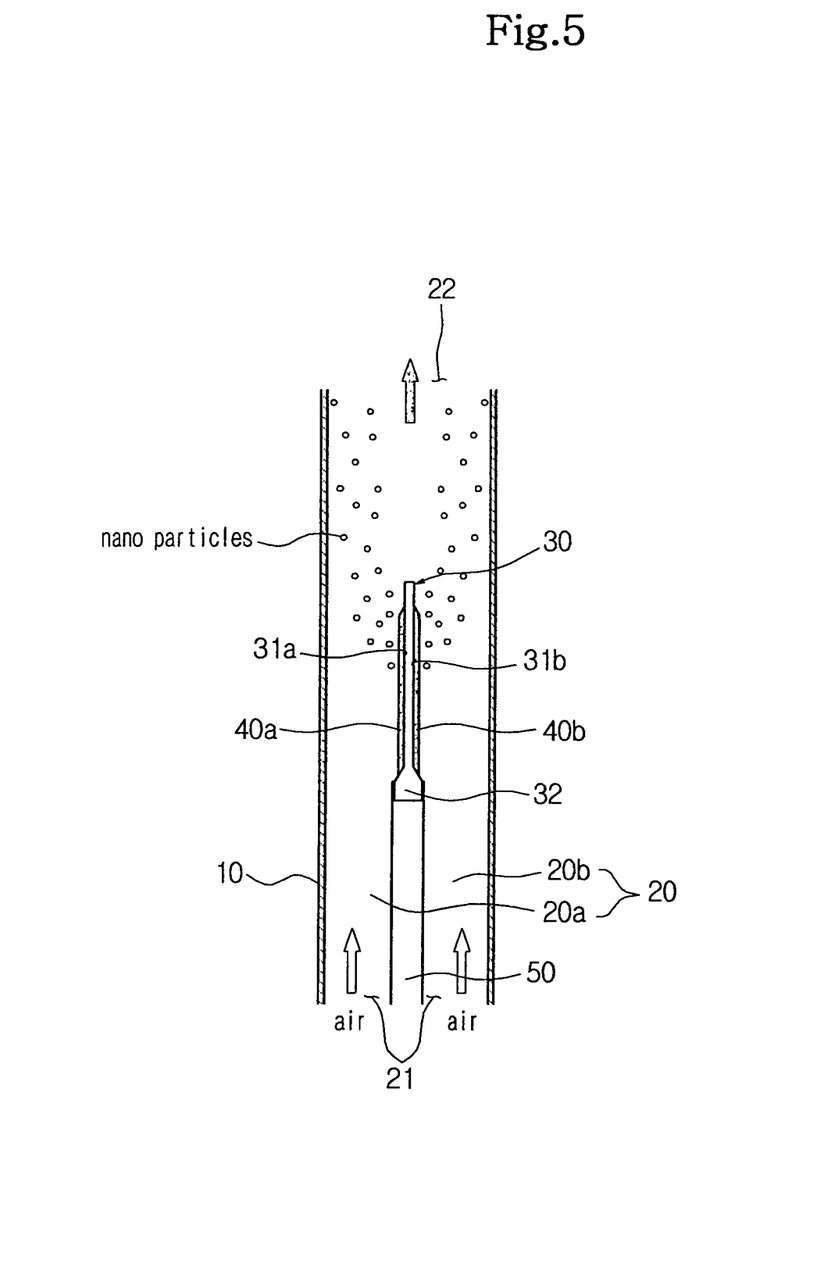
FIG. 5 is a view illustrating a nano particle generator according to a fifth embodiment of the present invention.

FIG. 5 is a view illustrating a nano particle generator according to a fifth embodiment of the present invention.

In this embodiment, no partition plates are disposed between the respective channels 20a and 20b and the heating unit 30.

Instead, the nano particle generator is constructed such that a fluid can flow along the respective channels at more than a predetermined speed. In this case, the straight movability of the fluid is increased, and therefore, the fluid flowing along the channel 20 does not directly contact the heating unit. As such, it is possible to prevent heat generated from the heating unit 30 from being transmitted to the body 10.

Figure 6:
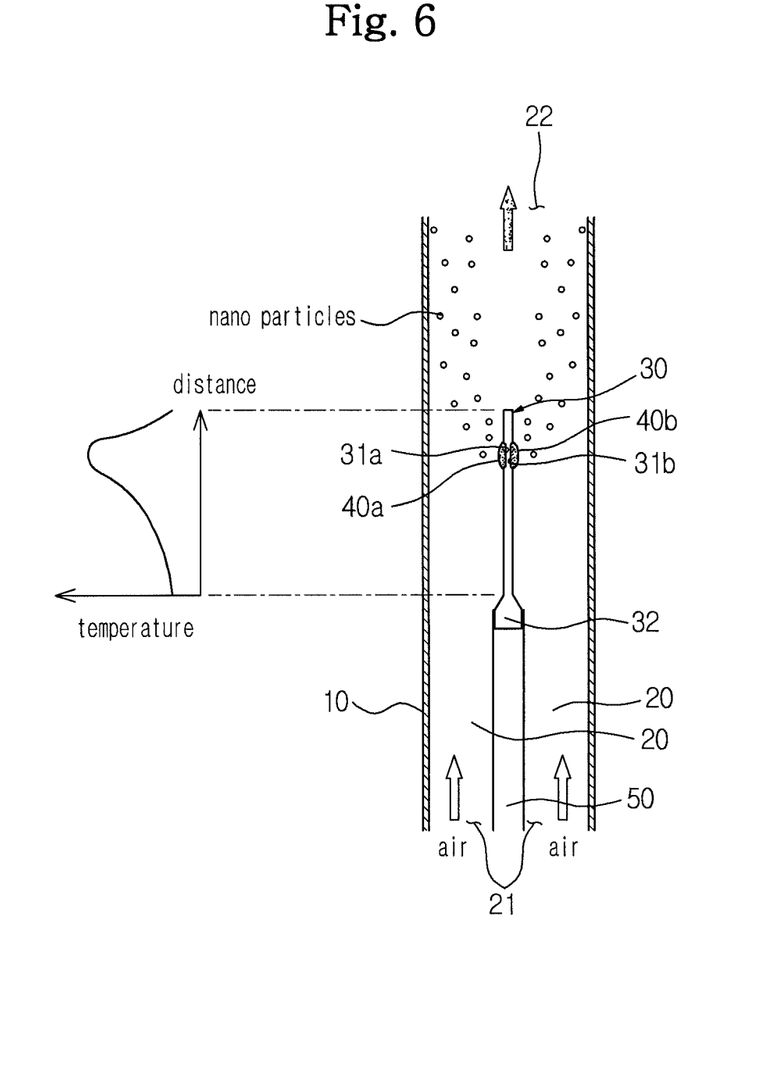
FIG. 6 is a view illustrating a nano particle generator according to a sixth embodiment of the present invention.

FIG. 6 is a view illustrating a nano particle generator according to a sixth embodiment of the present invention.

In this embodiment, a heating wire (not shown) mounted in the heating unit 30 is concentrated at one end of the heating unit 30, and therefore, the heating unit 30 has temperature distribution as shown in the drawing. Consequently, it is possible to prevent the insulating member 50, which supports the heating unit 30, from being damaged due to the high-temperature heating unit 30.

On the other hand, the materials 40a and 40b are located in the highest-temperature regions of the heating unit 30. As a result, when the nano particle generator is operated, the evaporation speed of the materials 40a and 40b is increased, and therefore, nano particles are generated in short time. The locating parts 31a and 31b are formed in the heating unit 30 such that the materials 40a and 40b are located in the locating parts 31a and 31b. When the materials 40a and 40b are heated by the heating unit 30, the materials 40a and 40b are changed from a solid phase to a liquid phase. The liquid-phase materials are evaporated into a gas phase. Preferably, the locating parts 31a and 31b are formed in the shape of a groove such that the materials 40a and 40b are not separated from the locating parts when the materials 40a and 40b are changed into the gas phase.

Figure 7:
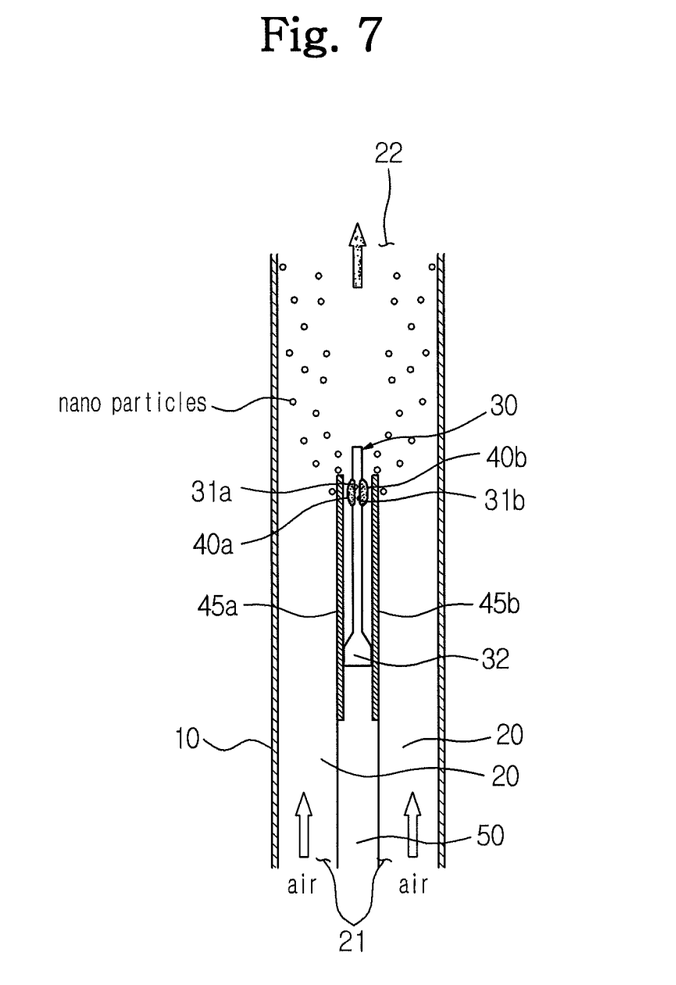
FIG. 7 is a view illustrating a nano particle generator according to a seventh embodiment of the present invention.

FIG. 7 is a view illustrating a nano particle generator according to a seventh embodiment of the present invention.

In this embodiment, the nano particle generator includes partition plates 45a and 45b disposed between the heating unit 30 and the body 10. In this case, the partition plates 45a and 45b are mounted to cover the highest-temperature regions of the heating unit 30 such that a radiant heat generated from the highest-temperature regions of the heating unit 30 is not transmitted to the body 10.

Figure 8A:
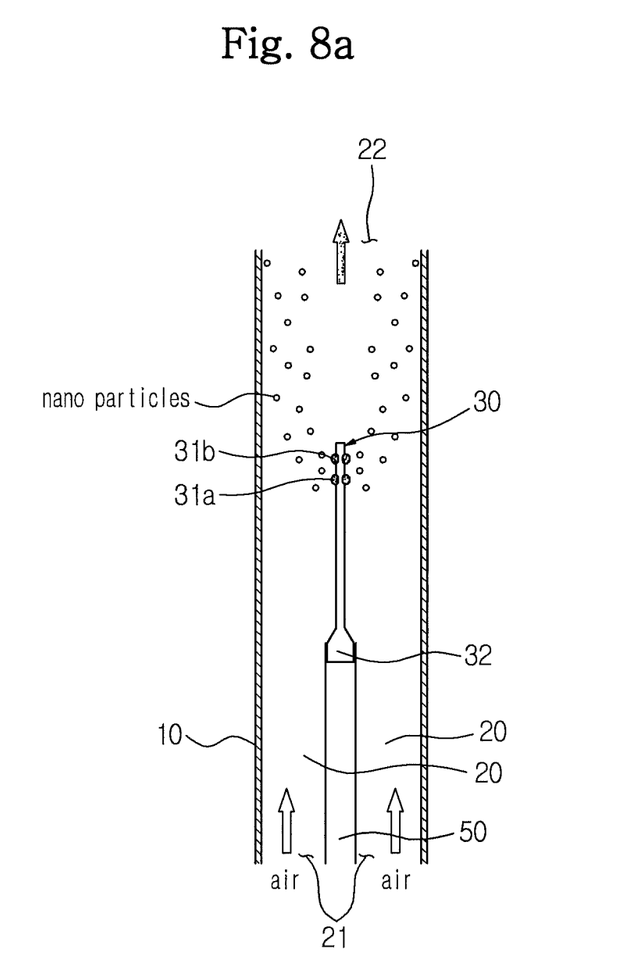
FIGS. 8A and 8B are views illustrating a nano particle generator according to an eighth embodiment of the present invention.
Figure 8B:
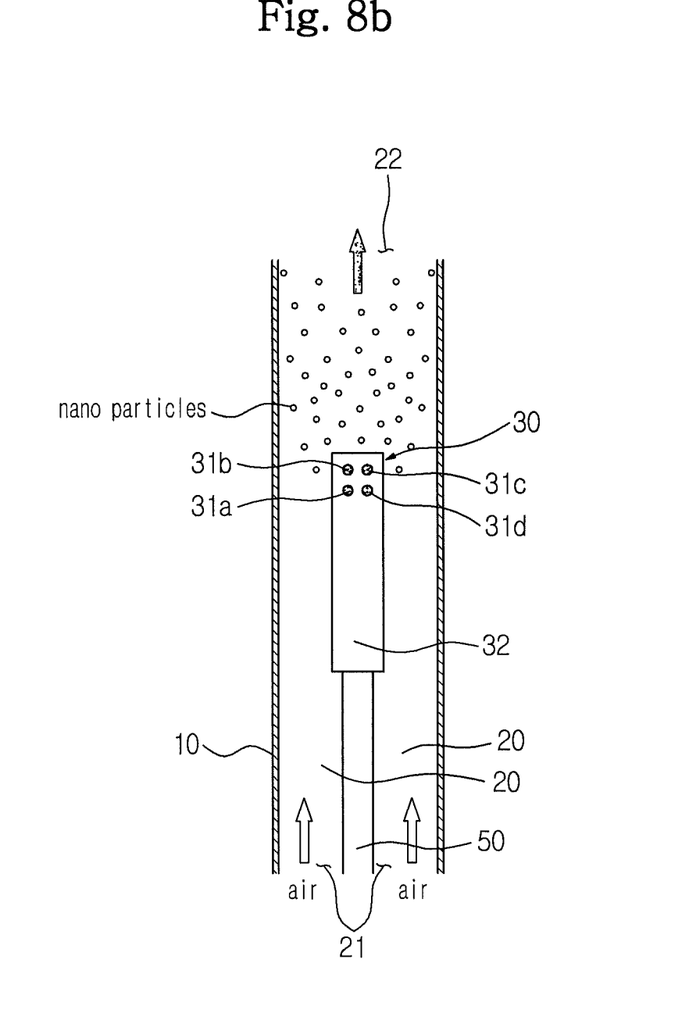

FIGS. 8A and 8B are view illustrating a nano particle generator according to an eighth embodiment of the present invention. A plurality of locating parts 31a, 31b, 31c, and 31d are formed in the highest-temperature regions of the heating unit 30. Consequently, when the nano particle generator is operated after the same material is located in the locating parts 31a, 31b, 31c, and 31d, it is possible to generate a large amount of nano particles at a time.

Figure 9:
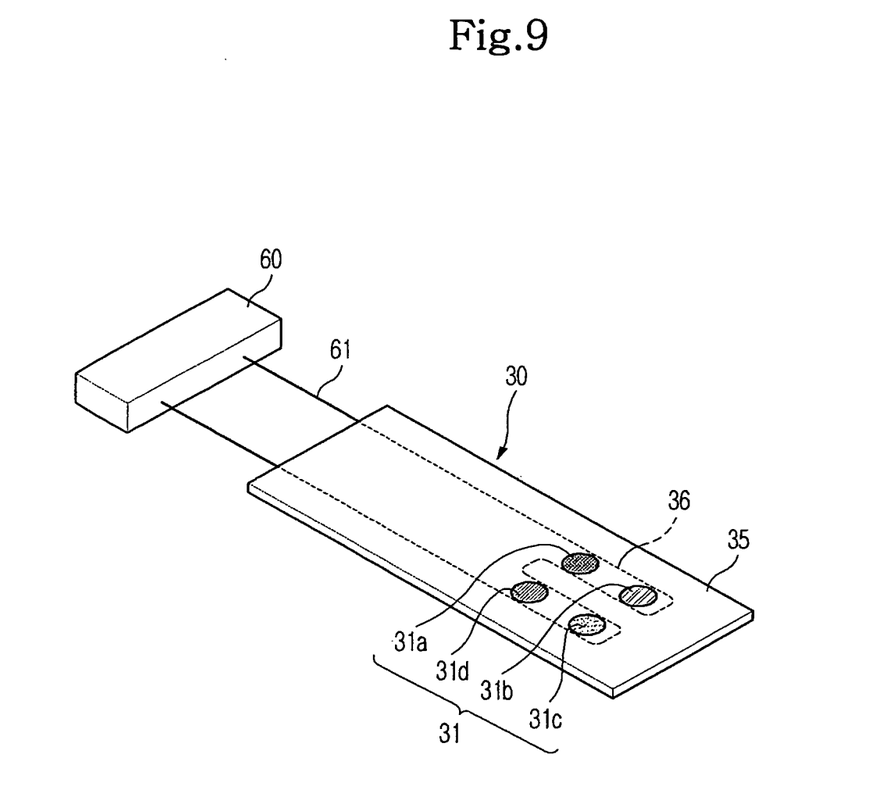
FIG. 9 is a view illustrating a nano particle generator according to a ninth embodiment of the present invention.

FIG. 9 is a view illustrating a heating unit and a power supply unit, which supplies power to the heating unit, of a nano particle generator according to a ninth embodiment of the present invention. Other components of the nano particle generator according to the ninth embodiment are identical to those of the nano particle generator shown in FIGS. 8A and 8B.

In this embodiment, the nano particle generator includes a heating unit 30 having a plurality of locating parts 31 formed in the upper part thereof to receive different materials, a power supply unit 60 to supply power to the heating unit 30, and a wire 61 to connect the power supply unit 60 and the heating unit 30.

The heating unit 30 includes a plate-shaped heating body 35, which is made of ceramic, and a heating wire 36 buried in the heating body 35 to generate heat when the heating unit 30 is supplied with power. The heating wire 36 is made of tungsten. The reason why the heating wire 36 is buried in the heating body 35 is to prevent the heating wire 36 from being corroded by a fluid flowing along the channel 20.

The heating wire 36 is bent several times in the heating body 35 in a serpentine fashion. Consequently, it is possible to evaporate the materials located in the heating unit 30 in short time.

The locating parts 31, in which the materials are located, are formed along a course in which the heating wire 36 extends. Different materials are located in the respective locating parts 31*a*, 31*b*, 31*c*, and 31*d*. The materials are evaporated at the same time, and therefore, nano particles having all characteristics of the respective materials are generated.

However, the evaporation temperatures for the respective materials are different from each other. Consequently, the locating parts 31*a*, 31*b*, 31*c*, and 31*d* must be heated to temperatures at which the respective materials are evaporated in the same time in order that nano particles are generated at the same time when the respective materials are heated.

In order to heat the locating parts 31*a*, 31*b*, 31*c*, and 31*d* to the temperatures at which the respective materials are evaporated in the same time, it is necessary to change the resistance of the heating wire 36 buried around the respective locating parts 31*a*, 31*b*, 31*c*, and 31*d*. The resistance of the heating wire 36 is easily changed by changing the thickness of the heating wire 36 extending around the respective locating parts 31*a*, 31*b*, 31*c*, and 31*d*.

As the different materials are evaporated at the same time as described above, nano particles having all characteristics of the respective materials are generated.

As apparent from the above description, a material is heated by the heating unit of the nano particle generator while being in direct contact with the heating unit, and the contact area between the heating unit and the insulating member is minimized. Consequently, it is possible to generate nano particles in short time while power consumption is reduced.

Also, no large space is necessary between the heating unit and the material. Consequently, it is possible to reduce the size of the nano particle generator.

Furthermore, several different materials are evaporated at the same time to generate nano particles. Consequently, it is possible to generate nano particles having all characteristics of the respective materials.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A nano particle generator, comprising:
   a body;
   a heating unit to apply heat in direct contact to a solid-phase material received in the body such that the material is evaporated to generate evaporated material; and
   a channel extending through the body such that the fluid to condense the evaporated material flows along the channel to generate nano particles having sizes in a range of 1 to 100 nm,
   wherein the heating unit includes
      a heating body;
      one heating wire buried in the heating body; and
      at least one locating part formed in the heating body such that the material is located in the locating part,
      wherein the heating wire is mounted so that the heating wire is concentrated at one end of the heating unit, and the locating part is formed at a region where the heating wire is concentrated,
      the heating unit directly heats the material located in the locating part,
   wherein the channel is partitioned into two channels by the heating unit, and partition plates are disposed between the respective channels and the heating unit, by which fluid flowing along the channels does not directly contact the heating unit.

2. The nano particle generator according to claim 1, wherein the heating unit is spaced apart from inner surfaces of the partition plates in a longitudinal direction of the two channels.

3. The nano particle generator according to claim 1, wherein the heating unit is disposed such that an evaporation direction of the material evaporated by the heating unit is parallel to a flow direction of the fluid in the two channels.

4. The nano particle generator according to claim 1, wherein at least two or more locating parts for locating the same material or different materials in the locating parts are provided.

5. The nano particle generator according to claim 1, further comprising an insulating member supporting the heating unit.

6. The nano particle generator according to claim 5, wherein only a lower end of the heating unit is supported by the insulating member.

7. The nano particle generator according to claim 1, wherein the material is coated on the locating part or is located in the locating part after the material is sintered.

8. The nano particle generator according to claim 1, wherein the partition plates cover the highest-temperature region of the heating unit.

9. The nano particle generator according to claim 1, wherein the locating parts are formed on one side of a plate-shaped heating body.

10. The nano particle generator according to claim 1, wherein the heating wire is bent several times in the heating body to form serpentine shape.

11. The nano particle generator according to claim 1, wherein the location parts are formed along a course in which the heating wire extends.

\* \* \* \* \*

UNITED STATES PATENT AND TRADEMARK OFFICE
CERTIFICATE OF CORRECTION

| | | |
|---|---|---|
| PATENT NO. | : 8,895,900 B2 | Page 1 of 1 |
| APPLICATION NO. | : 12/318277 | |
| DATED | : November 25, 2014 | |
| INVENTOR(S) | : Jun Ho Ji et al. | |

It is certified that error appears in the above-identified patent and that said Letters Patent is hereby corrected as shown below:

In the Claims

Column 8, line 46, In Claim 10, after "form" insert -- a --.

Signed and Sealed this
Second Day of June, 2015

Michelle K. Lee
*Director of the United States Patent and Trademark Office*